United States Patent [19]

Chiesa et al.

[11] Patent Number: 4,671,107
[45] Date of Patent: Jun. 9, 1987

[54] EGR DIAGNOSTIC SYSTEM

[75] Inventors: Alan F. Chiesa, Yale; LeRoy E. Medendorp; Edward C. Perry, both of Romeo; John F. Schweikert, Washington, all of Mich.

[73] Assignee: General Motors Corporation, Detroit, Mich.

[21] Appl. No.: 773,799

[22] Filed: Sep. 9, 1985

[51] Int. Cl.[4] ........................................... G01M 19/00
[52] U.S. Cl. .................................................. 73/118.2
[58] Field of Search ...................... 73/118; 364/431.06; 123/571, 568

[56] References Cited

U.S. PATENT DOCUMENTS

| 4,029,061 | 6/1977 | Asano | 123/32 EE |
| 4,149,408 | 4/1979 | Ezoe et al. | 73/118 |
| 4,164,206 | 8/1979 | Toelle | 364/431.06 |
| 4,252,098 | 2/1981 | Tomczak et al. | 123/32 EE |
| 4,548,185 | 10/1985 | Pozniak | 364/431.06 |

OTHER PUBLICATIONS

IEEE Standard Dictionary of Electrical and Electronics Terms, Third Edition, Jul. 20, 1984.
Ogata, Modern Control Engineering, Prentice-Hall Inc, 1970.

Primary Examiner—Michael J. Tokar
Assistant Examiner—Robert R. Raevis
Attorney, Agent, or Firm—Howard N. Conkey

[57] ABSTRACT

A system is described for diagnosing the operation of an exhaust gas recirculation system of an internal combustion engine having a speed density fuel delivery system and having a closed loop fuel adjustment. The EGR system operation is determined by disabling the EGR system and observing the magnitude of change of the integral adjustment of the closed loop system.

3 Claims, 4 Drawing Figures

EGR DIAGNOSTIC SYSTEM

This invention relates to a system for diagnosing an exhaust gas recirculation system of an internal combustion engine.

Vehicle internal combustion engines employ numerous subsystems and associated sensors to effect its operation. The subsystems include, for example, spark timing systems, fuel control systems and exhaust gas recirculation systems. The failure of any of the engine subsystems or their sensors may detrimentally affect the operation of the internal combustion engine in terms of either performance or emissions. Therefore, it is desirable to be able to diagnose the various subsystems and sensors of an internal combustion engine so as to evaluate whether or not the subsystem or sensor is operating in a satisfactory manner. This invention is directed toward a system for diagnosing the operation of the exhaust gas recirculation system of an internal combustion engine.

Recirculation of exhaust gases in an internal combustion engine has been developed as a method for inhibiting the formation of oxides of nitrogen during the combustion process of the engine. To accomplish that purpose, exhaust gas recirculation (EGR) control assemblies typically include valves for varying the amounts of exhaust gases recirculated with exhaust backpressure in order to provide exhaust gas recirculation substantially proportional to induction air flow. One such assembly is shown and described in the U.S. Pat. No. 4,364,368 issued on Dec. 21, 1982 and assigned to the assignee of this invention.

Exhaust gas recirculation assemblies may be utilized with numerous forms of engine fuel delivery means. For example, one such fuel delivery means may meter fuel based on air flow as measured by engine speed and the pressure in the engine intake manifold. This method of air flow measurement is commonly referred to as the speed density method.

In a speed density type of fuel system, a variation in the percentage of the exhaust gases recirculated into the intake manifold results in variation in the air and fuel ratio of the mixture supplied to the engine. When the fuel delivery system includes closed loop adjustment of the air/fuel ratio in response to an oxygen sensor positioned in the exhaust stream, the fuel delivered is adjusted via the closed loop integral and proportional adjustments to return the air/fuel ratio to the desired ratio which is typically the stoichiometric air/fuel ratio.

The subject invention provides for the diagnosing of the operation of the exhaust gas recirculation system on an internal combustion engine in which the fuel delivery system employs the speed density form of air measurement and in which the fuel delivery system includes a closed loop compensation of the air/fuel ratio of the mixture supplied to the engine. Particularly, this invention utilizes the reaction of the closed loop fuel integrator to a momentary change in the EGR flow to the engine to sense EGR system operation.

In accord with this invention, when the vehicle internal combustion engine is operating within a stabilized set of constraints and during which exhaust gases are normally recirculated into the intake manifold of the engine, the closed loop integral correction of the fuel supplied to the engine is stored in a memory. This correction represents the amount of the closed loop fuel adjustment required to obtain the desired air/fuel ratio. The exhaust gas recirculation system is then disabled which results in a shift in the air/fuel ratio of the mixture drawn into the cylinders of the engine from the intake manifold by an amount dependent upon the amount of exhaust gases recirculated prior to the EGR system being disabled. The closed loop fuel controller senses the shift in the air/fuel ratio and adjusts the fuel supplied to the engine to restore the air/fuel ratio to the desired value.

Over time and if the engine operating condition has not significantly changed, the closed loop integrator value represents the total closed loop fuel adjustment required to again obtain the desired air/fuel ratio. Therefore, the change in the closed loop integral adjustment required to restore the air/fuel ratio to the desired value represents the shift in the air/fuel ratio resulting from the disablement of the EGR system and therefore the amount of exhaust gases being recirculated by the EGR system prior to its disablement. If the change in the closed loop integral adjustment exceeds a calibration value, it is indicative of an EGR system that was operating satisfactorily before being disabled. However, if the integral adjustment does not exceed the calibration value, it is indicative of an exhaust gas recirculation system that was not operating in a satisfactory manner.

The invention may be best understood by reference to the following description of a preferred embodiment and the drawings in which.

Figure 1:
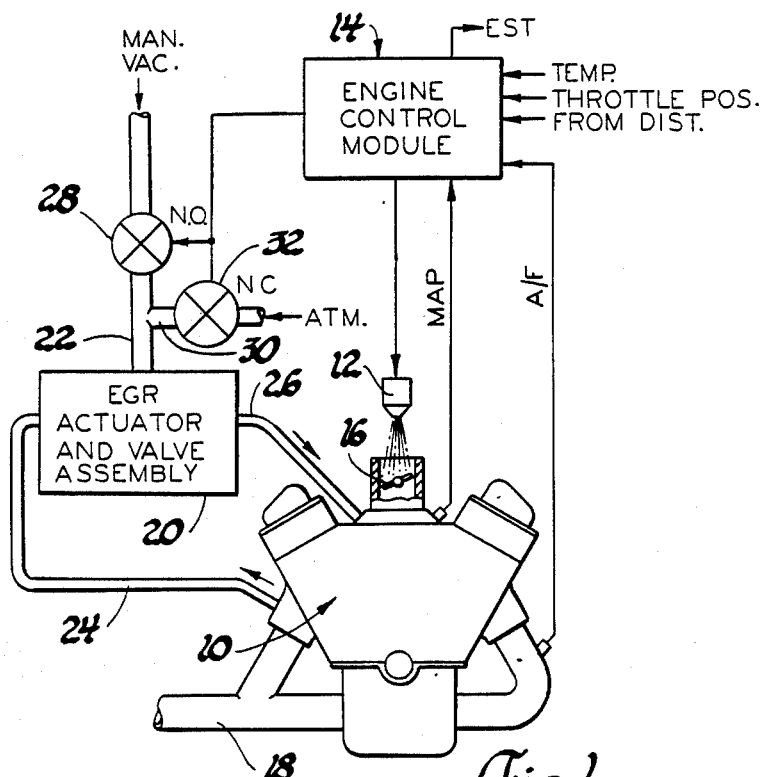
FIG. 1 illustrates an internal combustion engine and associated systems including an exhaust gas recirculation system.

Referring to FIG. 1, an internal combustion engine 10 is provided fuel by means of a single electromagnetic fuel injector 12 controlled by an engine control module 14 to inject fuel into the throttle bore of the engine 10 at a location above a conventional throttle valve 16. The fuel injected by the injector 12 is mixed with the air drawn into the cylinders of the engine 10 through the throttle bore to provide a combustible mixture. The exhaust gases from the cylinders are directed to the atmosphere through the exhaust manifolds of the engine and an exhaust conduit 18.

The fuel injector 12 is controlled by the engine control module 14 to maintain a scheduled air/fuel ratio such as the stoichiometric ratio in response to the engine operating parameters including manifold absolute pressure (MAP) as measured by a conventional pressure sensor and engine speed as measured from pulses provided by a conventional ignition distributor. The engine speed and MAP values are utilized by the engine control module to determine the mass rate of air flow into the engine 10 from which the required fuel to attain the predetermined ratio is determined. This form of air flow measurement is commonly referred to as speed-density and the fuel supply system is frequently referred to as a speed-density fuel delivery system.

The engine control module 14 provides for closed loop adjustment of the air/fuel ratio of the mixture supplied to the engine 10 to precisely maintain the predetermined stoichiometric air/fuel ratio. This is accomplished by sensing the air/fuel ratio of the mixture by means of a conventional oxygen sensor positioned in the exhaust stream of the engine which senses the oxidizing-reducing condition of the exhaust gases and which provides a signal to the engine control module 14 indicating the rich or lean status of the air/fuel ratio of the mixture supplied to the engine relative to the stoichiometric value.

The closed loop adjustment provided by the engine control module 14 comprises conventional proportional and integral terms. This form of closed loop fuel control system is conventional and will not be described in detail.

The engine 10 also includes an exhaust gas recirculation assembly for control of exhaust gas emissions. Exhaust gas recirculation is provided by a conventional backpressure controlled EGR valve 20 such as illustrated in the aforementioned U.S. Pat. No. 4,364,368.

In general, the backpressure EGR valve 20 receives a control vacuum signal from the manifold via a pneumatic conduit 22 and exhaust gases are directed thereto via a conduit 24. The exhaust gases recirculated are provided to the intake manifold from the valve 20 via a conduit 26. A normally open electromagnetic valve 28 is positioned in the vacuum conduit 22 and is operative when energized via the engine control module 14 to close off the manifold vacuum control signal input to the EGR valve 20. A conduit 30 including a normally closed electromagnetic valve 32 couples the manifold vacuum control signal input to the EGR valve 20 to atmosphere when the valve 32 is energized by the engine control module 14. By energizing the valves 28 and 32, the engine control module 14 may disable the EGR valve 20 from recirculating exhaust gases via the conduits 24 and 26.

The engine control module 14 additionally receives inputs from a conventional engine coolant temperature sensor and a conventional throttle position sensor.

Figure 2:
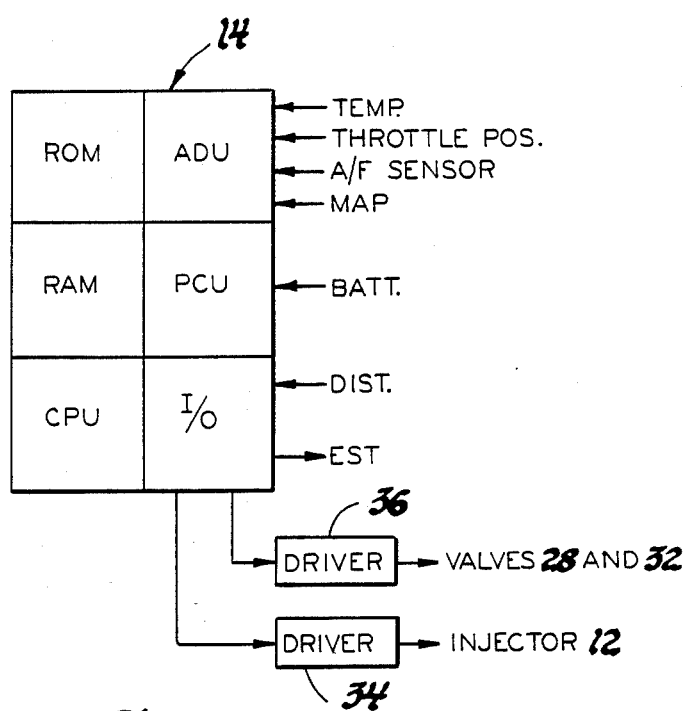
FIG. 2 is a diagram of the digital engine control module of FIG. 1 that is operative to diagnose the operation of the exhaust gas recirculation system in accord with the principles of this invention.

Referring to FIG. 2, the engine control module 14 takes the form of a digital computer. The digital computer is standard in form and includes a central processing unit (CPU) which executes an operating program permanently stored in a read-only memory (ROM) which also stores tables and constants utilized in determining the fuel requirements of the engine and for executing the exhaust gas recirculation diagnostic routine of this invention. Contained within the CPU are conventional counters, registers, accumulators, flag flip flops, etc., along with a clock which provides a high frequency clock signal.

The digital computer also includes a random access memory (RAM) into which data may be temporarily stored and from which data may be read at various address locations determined in accord with the programs stored in the ROM. A power control unit (PCU) receives the voltage from the vehicle battery through the vehicle ignition switch and provides regulated power to the various operating circuits in the engine control module 14.

An input/output circuit (I/0) includes output counter sections independently controlled by the CPU to provide electronic spark timing signals (EST) to the distributor to provide spark timing in the conventional manner and for providing timed injector control pulses to a driver circuit 34 for controlling the opening time of the injector 12. The I/0 also includes an output port from a bistable circuit for issuing command pulses to a driver circuit 36 for controlling the valves 28 and 32 of FIG. 1 and an input counter section which receives a pulse output from the vehicle distributor which generates a pulse for each cylinder during each engine cycle. The pulses from the distributor are used for determining the engine speed and also may be used for initiating the energization of the fuel injector 12.

The engine control module 14 further includes an analog-to-digital unit (ADU) which provides for the measurement of analog signals. In the present embodiment, the analog signals include the manifold absolute pressure signal (MAP), the throttle position signal, the engine coolant temperature signal and the air/fuel ratio signal from the air/fuel sensor. The analog signals are each sampled and converted under control of the CPU and stored in ROM designated RAM memory locations.

When power is first applied to the engine control module 14 such as by the operation of the vehicle ignition switch, the program in the digital computer is initiated and thereafter provides for system initialization. During this initialization step, initial values stored in the ROM are entered into ROM designated locations in the RAM and counters, flags, and timers are initialized. Thereafter, the program proceeds to a background loop that is continuously executed at, for example, 100 millisecond intervals during which the diagnostic routines including the EGR diagnostic routine of this invention is executed. This background loop is periodically interrupted at, for example, 10 millisecond intervals after which certain programs are executed for controlling functions such as the fuel control function.

Figure 3:
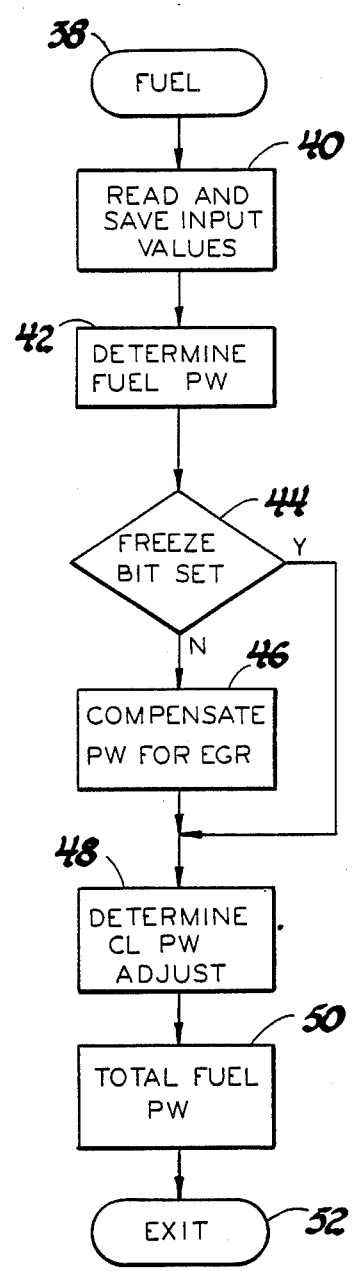
FIGS. 3 and 4 are diagrams illustrating the operation of the digital engine control module in diagnosing the exhaust gas recirculation system.

The flow chart of FIG. 3 illustrates the general operation of the digital computer in the determination of the required pulse width to be applied to the fuel injector in order to provide the desired air/fuel ratio, which in the preferred embodiment is the stoichiometric ratio which maximizes the conversion efficiency of a three-way catalytic converter that is typically positioned in the exhaust stream.

The fuel control routine of FIG. 3, which is executed following each interrupt of the background loop, is entered at point 38 and proceeds to a step 40 where the values of manifold absolute pressure, air/fuel ratio, throttle position, temperature, and engine speed are determined via the ADU and the I/0 and stored in ROM designated RAM memory locations. Thereafter, the program proceeds to a step 42 where the base fuel pulse width to achieve the stoichiometric air/fuel ratio is calculated. This calculation is based upon the air flow into the engine determined by the speed density method of air flow computation.

The program next proceeds to a decision point 44 where the condition of a freeze bit in a ROM designated RAM memory location is sensed. The freeze bit will be described with respect to the exhaust gas recirculation diagnostic routine of FIG. 4. This bit is set during the EGR diagnostic routine during a period in which exhaust gas recirculation is disabled. If the bit is not set indicating the exhaust gas recirculation system is enabled, the program proceeds to a step 46 where the base fuel pulse width determined at step 42 is open loop compensated for exhaust gases recirculated into the engine via the EGR valve 20. If, however, the freeze bit is set indicating that the exhaust gas recirculation system is disabled via the EGR diagnostic routine, the program bypasses the step 46.

From the step 46 or the decision point 44 if step 46 is to be bypassed, the program proceeds to a step 48 where a closed loop adjustment to be made to the fuel pulse width in response to the sensed air/fuel ratio from the exhaust gas sensor in direction to achieve the stoichiometric air/fuel ratio is determined. This closed loop adjustment includes an integral term portion the value of which is based on the error in the air/fuel ratio established by operation of the steps 42 and 46.

Next the program proceeds to step 50 where the closed loop adjustment determined at step 48 is summed to the fuel pulse width determined at step 46 (or step 42 if step 46 was bypassed) to provide a resulting fuel pulse width determined to achieve the stoichiometric air/fuel ratio. From step 50, the program exits the routine at 52. The determined pulse width is issued to injector 12 upon receipt of a pulse from the distributor in the conventional manner for supplying fuel to the internal combustion engine 10.

Figure 4:
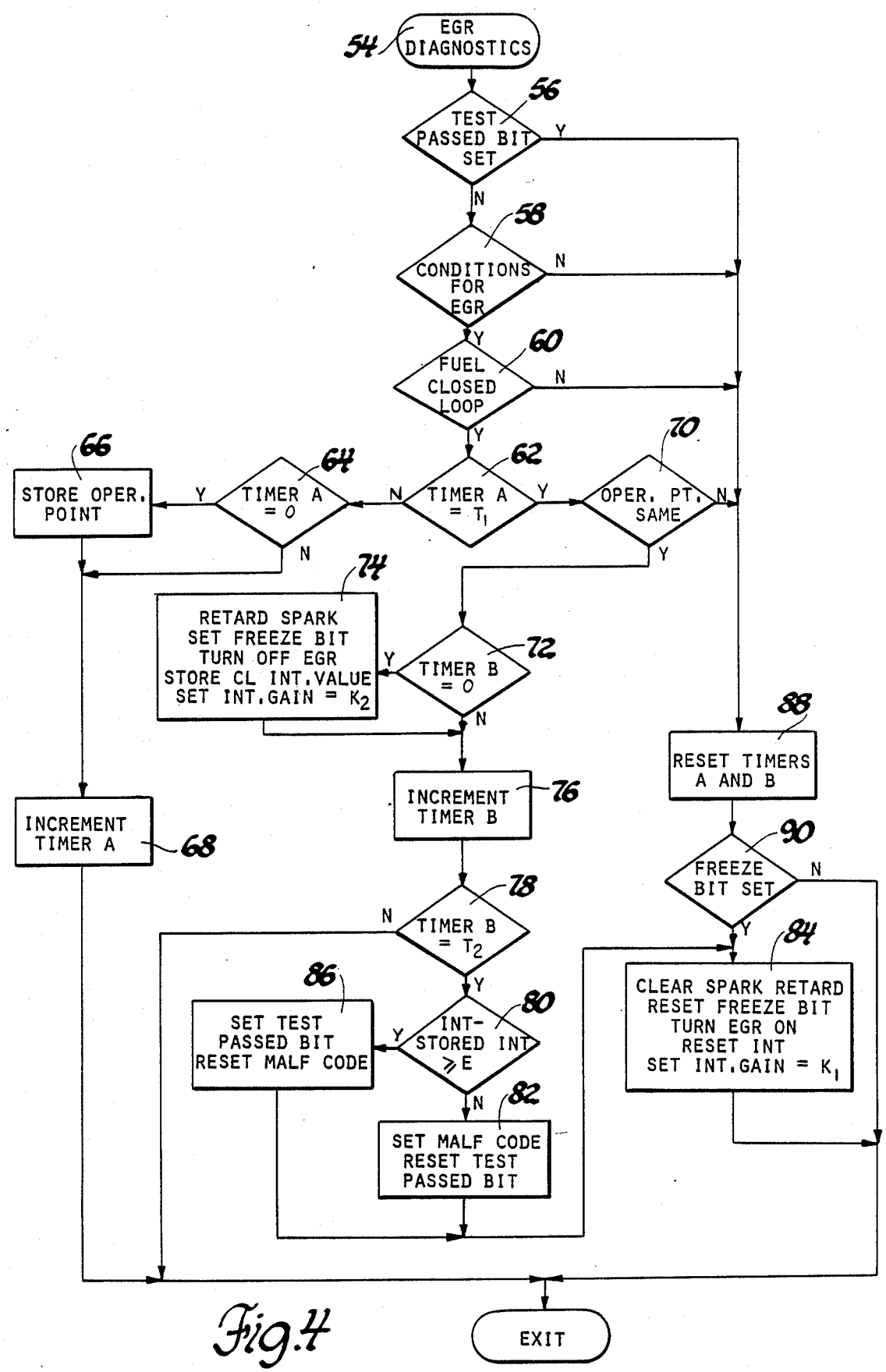

Referring to FIG. 4, there is illustrated the EGR diagnostics routine that is executed at 100 millisecond intervals during the background loop of the digital computer of the engine control module 14. The EGR diagnostics routine is entered at point 54 and then proceeds to a decision point 56 where it determines whether or not the EGR diagnostics routine had previously tested the EGR system and found its operation satisfactory since the digital computer of the engine control module 14 was last initialized upon power being applied thereto. This is accomplished by sampling a test passed bit in a RAM memory location which is reset upon system initialization and which is set if the EGR diagnostics routine indicates that the EGR system has passed the required operating criteria. If this bit is in a reset condition indicating that the EGR system has not yet passed the EGR test criteria, the program proceeds to a decision point 58 where it determines whether certain engine operating conditions are within respective range values representing that the EGR system should be recirculating exhaust gases to the intake manifold of the engine 10. These operating conditions may include coolant temperature, throttle position, manifold absolute pressure and engine speed.

If all of the conditions are within their respective range values, the program proceeds to a step 60 where it determines whether or not the fuel is being closed loop adjusted in response to the air/fuel ratio sensor in the exhaust system of the engine 10. For example, it is typical in the known closed loop fuel control systems to disable closed loop fuel adjustment during certain engine operating conditions including engine warm-up.

If the fuel is being adjusted closed loop, the program proceeds to a decision point 62 where the value of a timing register A in the RAM is compared to a calibration constant $T_1$. The time period $T_1$ represents the time required for the engine 10 to be operating at the safe operating point representing steady state engine operation before the EGR system will be tested. If the steady state operating time is not equal to $T_1$, the program proceeds to a decision point 64 where it determines whether or not the time in register A is zero. If the time in register A is zero, the program proceeds to a step 66 where the operating point of the engine is stored in the RAM. The operating point may be represented by the value of engine speed and engine load as represented by either manifold pressure or throttle angle.

Following step 66 or following decision point 64 if the time in register A is greater than zero, the program proceeds to a step 68 where the timing register A is incremented. Thereafter, the program exits the routine of FIG. 4. Assuming the conditions in steps 56 through 60 do not change, the foregoing steps are repeated until the time in register A becomes equal to $T_1$ as sensed at decision point 62. Thereafter, the program proceeds from decision point 62 to the decision point 70 where the present engine operating point as represented by the last sensed values of engine speed and engine load at step 40 of FIG. 3 is compared to the operating point stored at step 66. If the operating point is the same, the engine 10 has operated at a stable state for a period sufficient to allow the closed loop integrator to adjust the fuel to the stoichiometric ratio at that engine operating point and that those conditions still exist.

Assuming the engine operating point has remained the same, the program proceeds to a decision point 72 where the time in a timing register B in the RAM is compared to zero. If the time is zero, the program proceeds to a step 74 to initiate the test of the EGR system. At this step, the closed loop integrator gain utilized in step 48 is increased from a value $K_1$ to a value $K_2$, the value of the current closed loop integral fuel adjustment is stored in a ROM designated RAM location, the valves 28 and 32 of FIG. 1 are energized to disable the exhaust gas recirculating system, the freeze bit previously described in decision point 44 of FIG. 3 is set indicating test in progress and the electronic spark timing signal provided to the engine distributor is adjusted to retard the spark to prevent knocking that otherwise may result as the result of the exhaust as recirculation system being disabled.

From step 74, the program proceeds to a step 76 where the timing register B is incremented. Thereafter and until the timing register B is reset, the program proceeds directly from decision point 72 to step 76 bypassing the step 74.

From step 76, the program proceeds to a decision point 78 wherein the time in timing register B is compared to a calibration constant $T_2$, the time interval $T_2$ being sufficient to allow the closed loop integrator to readjust the air/fuel ratio to the stoichiometric value after termination of the exhaust gases recirculated into the intake manifold at step 74. If the time stored in the timing register B has not yet attained the value $T_2$, the program exits the EGR diagnostics routine.

When the timing register B has been incremented by repeated executions of the routine of FIG. 4 to the value $T_2$, the program proceeds from the decision point 78 to a decision point 80 where the value of the closed loop integrator (which is the value required to adjust the air/fuel ratio to the stoichiometric ratio in response to the absence of exhaust gas recirculation) is compared to the value of the integrator stored at step 74 at the beginning the time period $T_2$. The difference is representative of the amount of exhaust gases being recirculated to the engine 10 prior to being disabled at step 74. A difference of calibration value E represents a satisfactory recirculation of exhaust gases into the internal combustion engine 10 prior to step 74. If the difference is equal to or greater than E, the program then proceeds to the step 86 where the passed test bit is set indicating that the exhaust gas recirculation system has passed the diagnostics test. Also at this step, a malfunction code bit is reset.

The program next proceeds to a step 84 where the system is returned to the initial state for normal operation by clearing the spark retard request, resetting the freeze bit, again enabling EGR by deenergizing the valves 28 and 32 of FIG. 1, setting the closed loop integrator to the value stored at step 74 and returning the closed loop integrator gain to the value $K_1$. The program then exits the EGR diagnostics routine.

If at step 80, it is determined that the change in the integral adjustment required to return the air/fuel ratio to the stoichiometric ratio is less than the value E, the exhaust gases recirculated to the engine by the EGR system prior to step 74 were inadequate representing a malfunction in the EGR system. The program then proceeds to the step 82 where the malfunction code bit in the RAM is set and the passed test bit is reset to provide an indication of the failed test. An alarm may also be provided to the vehicle operator at this step via the I/0. The system then proceeds to the step 84 to return the vehicle to the normal operating condition as previously described.

If at any time during the repeated executions of the EGR diagnostics routine and prior to the expiration of the time period $T_1$ as determined at decision point 62 or the time period $T_2$ as determined at decision 78, any of the criteria of decision points 58, 60, and 70 are not met, re-initiation of the EGR system test occurs by resetting the timing registers A and B at the step 88. If the timing registers A and B are reset at step 88, the program proceeds to the step 90 where the freeze bit in the RAM is sampled. If set, indicating that the test had been initiated but some criteria occurred terminating the test, the program proceeds to the step 84 to re-initialize the system as previously described. However, if the freeze bit is reset, the program exits the routine.

The foregoing description of a preferred embodiment for the purpose of illustrating the invention is not to be considered as limiting the invention since many modifications may be made by the exercise of skill in the art without departing from the scope of the invention.

The embodiments of the invention in which an exclusive property or privilege is claimed are defined as follows:

1. The method of testing an exhaust gas recirculating system of an internal combustion engine having an airfuel mixture delivery system and a closed loop integral adjustment of the air/fuel ratio of the mixture delivered to the engine, the method comprising the steps of:
    disabling the exhaust gas recirculating system;
    determining the change in the integral adjustment of the air/fuel ratio over a predetermined period after the exhaust gas recirculating system is disabled; and
    providing an indication of an exhaust gas recirculating system failure if the change of the integral adjustment is less than a predetermined amount.

2. For an internal combustion engine having an intake space from which a mixture of air and fuel are drawn into a combustion space to undergo combustion and an exhaust passage into which exhaust gases are discharged from the combustion space, the system comprising, in combination:
    EGR means for recirculating a portion of the exhaust gases from the exhaust passage into the intake space;
    fuel delivery means responsive to the speed of the engine and the pressure in the intake space for supplying a quantity of fuel to the intake space determined to provide a predetermined air/fuel ratio of the mixture drawn into the combustion space;
    means for providing a closed loop integral adjustment to the fuel supplied to the intake space by the fuel delivery means so as to establish the predetermined air/fuel ratio; and
    means for testing the operation of the EGR means including (A) means for disabling the EGR means, (B) means for determining the change in the closed loop integral adjustment to the fuel supplied to the intake space over a predetermined period after the EGR means is disabled, and (C) means for providing an indication of an EGR means failure when the determined change in the closed loop integral adjustment is less than a predetermined amount.

3. For an internal combustion engine having an intake space from which a mixture of air and fuel are drawn into a combustion space to undergo combustion and an exhaust passage into which exhaust gases are discharged from the combustion space, the system comprising, in combination:
    EGR means for recirculating a portion of the exhaust gases from the exhaust passage into the intake space;
    fuel delivery means responsive to the speed of the engine and the pressure in the intake space for supplying a quantity of fuel to the intake space determined to provide a predetermined air/fuel ratio of the mixture drawn into the combustion space;
    closed loop control means responsive to the oxidizing-reducing condition of the exhaust gases for providing a closed loop adjustment to the fuel supplied to the intake space by the fuel delivery means so as to establish the predetermined air/fuel ratio, the closed loop adjustment including an integral term adjustment; and
    means for testing the operation of the EGR means including, (A) means for storing the value of the integral term/adjustment at a time T, (B) means for disabling the EGR means at the time T, the EGR means being ineffective when disabled for recirculating exhaust gases to the intake space, the air/fuel ratio of the mixture drawn into the combustion space shifting by an amount dependent upon the amount of exhaust gases previously recirculated, (C) means for determining the difference between the value of the integral term adjustment and the stored value of the integral term adjustment at a time spaced from the time T by an interval that allows the closed loop control means to adjust the fuel supplied to the intake space by the fuel delivery means to return the air/fuel ratio to the predetermined air/fuel ratio and (D) means for providing an indication of an EGR means failure when the difference is less than a predetermined amount.

* * * * *